(12) United States Patent
Musshorn

(10) Patent No.: US 11,878,730 B1
(45) Date of Patent: Jan. 23, 2024

(54) ATTACHABLE HANDLE FOR A STROLLER

(71) Applicant: Kurt Musshorn, Plainville, CT (US)

(72) Inventor: Kurt Musshorn, Plainville, CT (US)

(*) Notice: Subject to any disclaimer, the term of this patent is extended or adjusted under 35 U.S.C. 154(b) by 581 days.

(21) Appl. No.: 17/106,603

(22) Filed: Nov. 30, 2020

(51) Int. Cl.
| | | |
|---|---|---|
| *B62B 9/20* | (2006.01) | |
| *B62B 7/04* | (2006.01) | |
| *A63B 23/035* | (2006.01) | |
| *A63B 21/00* | (2006.01) | |
| *A63B 23/12* | (2006.01) | |
| *A63B 21/02* | (2006.01) | |
| *A63B 21/04* | (2006.01) | |

(52) U.S. Cl.
CPC .............. *B62B 9/20* (2013.01); *A63B 21/023* (2013.01); *A63B 21/0421* (2013.01); *A63B 21/4035* (2015.10); *A63B 21/4047* (2015.10); *A63B 23/03533* (2013.01); *A63B 23/12* (2013.01); *B62B 7/04* (2013.01); *A63B 2210/50* (2013.01); *A63B 2225/09* (2013.01)

(58) Field of Classification Search
CPC ......... B62B 9/20; B62B 7/04; A63B 21/4035; A63B 21/4047; A63B 21/023; A63B 21/0421; A63B 23/03533; A63B 23/12; A63B 2210/50; A63B 2225/09; A63B 69/0028

See application file for complete search history.

(56) References Cited

U.S. PATENT DOCUMENTS

| | | | | |
|---|---|---|---|---|
| 4,193,593 A * | 3/1980 | Wilson | ............... | A63B 21/0552 482/122 |
| 4,572,500 A * | 2/1986 | Weiss | ................. | A63B 22/0076 482/73 |
| 4,625,963 A * | 12/1986 | Lancellotti | ....... | A63B 23/03533 482/130 |
| 5,634,870 A * | 6/1997 | Wilkinson | ......... | A63B 23/1263 482/52 |
| 5,674,165 A | 10/1997 | Cohen et al. | | |
| 5,876,309 A | 3/1999 | Archey | | |
| 6,196,947 B1 * | 3/2001 | Anderson | .......... | A63B 69/0028 280/47.38 |
| 6,722,689 B2 * | 4/2004 | Kreamer | ................... | B62B 9/20 280/47.38 |
| 7,309,071 B1 | 12/2007 | Michael | | |
| 7,311,313 B1 * | 12/2007 | Ray | ........................ | B62B 5/068 280/47.38 |
| 7,328,906 B1 * | 2/2008 | Berkovich | ....... | A63B 23/03575 280/47.38 |
| 8,464,397 B2 | 6/2013 | Arnold, IV et al. | | |

(Continued)

OTHER PUBLICATIONS

The Jogalong Stroller. Product Listing [online]. Jogalong.com [retrieved on Jun. 29, 2020]. Retrieved from the Internet: <URL: https://jogalong.com/shop/>.

(Continued)

*Primary Examiner* — Victor D Batson
*Assistant Examiner* — Matthew J Sullivan
(74) *Attorney, Agent, or Firm* — Cramer Patent & Design PLLC; Aaron R. Cramer

(57) ABSTRACT

An attachable handle for a stroller comprises a tubular cross-bar removably securable across the span of a stroller rear handlebar. A pair of tubular handles having a limited range of independent forward and backward resilient motion each are movably secured to the tubular cross-bar. The device is capable of folding down when not in use.

16 Claims, 4 Drawing Sheets

(56) References Cited

U.S. PATENT DOCUMENTS

| | | | | |
|---|---|---|---|---|
| 8,777,821 | B2* | 7/2014 | Lando | A63B 23/1245 |
| | | | | 482/121 |
| 9,144,708 | B2* | 9/2015 | Selek | A63B 23/03541 |
| 9,266,550 | B1* | 2/2016 | Shah | B62B 9/20 |
| 10,173,093 | B2* | 1/2019 | Shi | A63B 21/045 |
| 11,518,425 | B2* | 12/2022 | Villarreal | B62B 9/20 |
| 2014/0008883 | A1* | 1/2014 | Litman | A63B 23/1209 |
| | | | | 280/47.38 |
| 2015/0183451 | A1* | 7/2015 | Stierli | B62B 9/206 |
| | | | | 16/421 |
| 2020/0276999 | A1* | 9/2020 | Fanelli | B62B 9/20 |
| 2021/0070345 | A1* | 3/2021 | Sun | B62B 9/20 |
| 2022/0371644 | A1* | 11/2022 | Peloquin | A63B 21/4035 |

OTHER PUBLICATIONS

Love Handles RX 10-0705 Portable Upper Body Exerciser to use with Chair or Wheelchair. Product Listing [online]. © 2020 Walmart [retrieved on Jun. 29, 2020]. Retrieved from the Internet: <URL: https://www.walmart.com/ip/Love-Handles-RX-10-0705-Portable-Upper-Body-Exerciser-to-use-with-Chair-or-Wheelchair/ 15555451.

* cited by examiner

ATTACHABLE HANDLE FOR A STROLLER

RELATED APPLICATIONS

None.

FIELD OF THE INVENTION

The present invention relates to an attachable handle and more specifically to an attachable handle for a stroller.

BACKGROUND OF THE INVENTION

Perhaps the most common of baby care accessories is the baby stroller. A stroller not only makes it easy to transport a child, but their belongings as well, while keeping them safe and out of trouble. During the use of a stroller, the parent or care giver is also provided with the added benefit of healthy exercise, should it be used for a long, brisk walk around the neighborhood. For those who wish to jog or run while pushing a stroller, the market has responded with jogging style strollers, with large bicycle style wheels that allow for higher speeds while still safely protecting the child.

However, while running or jogging, the human body wishes to move their arms back and forth along their torso. Unfortunately, the typical jogging stroller has a fixed handle resulting in an awkward running stance. Accordingly, there exists a need for a means by which stroller usage can more readily accommodate natural arm movement of those wishing to run or jog with the stroller. The development of the Attachable Handle for a Stroller fulfills this need.

SUMMARY OF THE INVENTION

The disadvantages of the prior art are overcome by the present invention in providing a stroller running handle device that has a pair of bracket mounts with each of the pair of bracket mounts being disposed on each of a first distal end and a second distal end of a center mounting frame. The bracket mounts are adapted to connect to a stroller handle of a jogging stroller with a means for attachment. A stroller running handle also has a pair of spring housings which are disposed on an outer end of the center mounting frame with each of the spring housings being provided with a spring locking pin. A stroller running handle also has a pair of extension arms with each having an uppermost end. The overall length of each of the extension arms are adjusted along a handle length travel path, by varying an amount of engagement of an upper extension arm segment of the extension arms within a lower extension arm segment of the extension arms. A stroller running handle also has a pair of running handles which has a first handle and a second handle with the first handle being pushed on to move the jogging stroller forward and a reciprocating spring driving the second running handle of the pair of running handles backwards.

The means for attachment may include two pairs of pipe clamps and may be removable. The means for attachment may be moved and utilized on another jogging stroller. Upon removal of the bracket mounts, the stroller handle may include no bracket mount markings disposed on the stroller handle. One of the two pairs of pipe clamps may attach each of the pair of bracket mounts. Each of the bracket mounts may be sized to span the stroller handle width. The center mounting frame may be centrally disposed on each of the bracket mounts in a perpendicular manner. The bracket mounts may allow the diameter of the stroller handle to vary. The bracket mounts may be universally designed.

When the spring locking pins are disengaged, the extension arms may fold forward along a folding travel path to allow both of the extension arms to move within the stroller handle to allow for storage and/or transport of the jogging stroller. The spring housings may be connected to the lower extension arm segment of the extension arms into which the upper extension arm segment is inserted. The lower extension arm segment may be provided with a plurality of holes arranged in a linear format.

The extension arms may each include a length adjustment pin, which may be engaged with the spring locking pin. Each of the uppermost ends of the extension arms may be provided with an ergonomic hand grip for non-slip operation. The upper end of the upper extension arm segment may be provided with an offset angle to allow for a more vertical position of the ergonomic hand grips. The center mounting frame may be encompassed by the reciprocating spring which allows for a first semi-circular travel path. A first end of the first semi-circular travel path may be connected to the center mounting frame while the opposite end is connected to the spring housings. The reciprocating spring may be contained within the spring housings and is mechanically affixed to the first end housing at one end and subsequently affixed to the center mounting frame. The opposite end of the reciprocating spring may be affixed to a second end housing and may be affixed to the center mounting frame by a spring locking pin.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
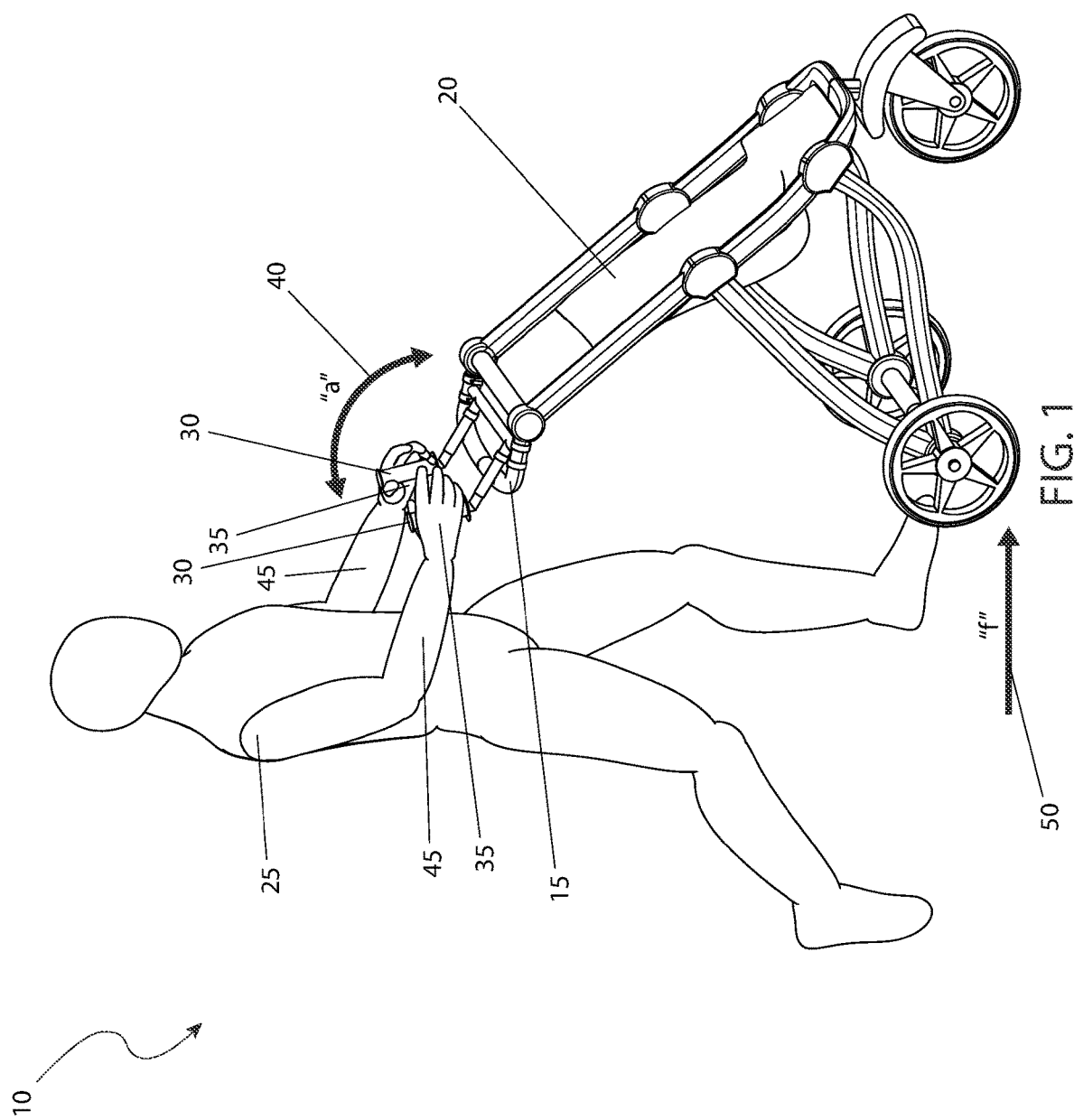
FIG. 1 is a perspective view of the stroller running handle device, shown in a utilized state, according to the preferred embodiment of the present invention.

10 stroller running handle device
15 stroller handle
20 jogging stroller
25 user
30 handle
35 wrists
40 first semi-circular travel path "a"
45 arms
50 forward motion travel path "f"

55 bracket mount
60 center mounting frame
65 attachment means
70 spring housing
75 extension arms
80 ergonomic hand grip
85 length adjustment pin
90 spring locking pin
95 folding travel path "s"
100 reciprocating spring
105 lower extension arm segment
110 upper extension arm segment
115 pin spring
120 handle length travel path "h"
125 offset angle "d"
130 first end housing
135 second end housing
140 threads

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a perspective view of the stroller running handle device 10, shown in a utilized state, according to the preferred embodiment of the present invention is disclosed. The stroller running handle device 10 (herein also described as the "device") 10, provides an add-on handle system for jogging strollers 20 that not only assists a user 25 in propelling the stroller, but affords the user 25 an integrated exercising system. The stroller running handle device 10 is attached to the stroller handle 15 of a conventional jogging stroller 20. The user 25 grabs the two (2) running handles 30 as shown. This rotates the wrists 35 of the user 25 into a vertical position in lieu of a horizontal position as is the case with the stroller handle 15. The device 10 provides motion for the running handles 30 along a first semi-circular travel path "a" 40 which allows the natural running motion of the arms 45 of the runner/jogger 25. This motion occurs as the jogging stroller 20 is pushed forward along a forward motion travel path "f" 50. Further description of the internals of the device 10 will be provided herein below.

Figure 2:
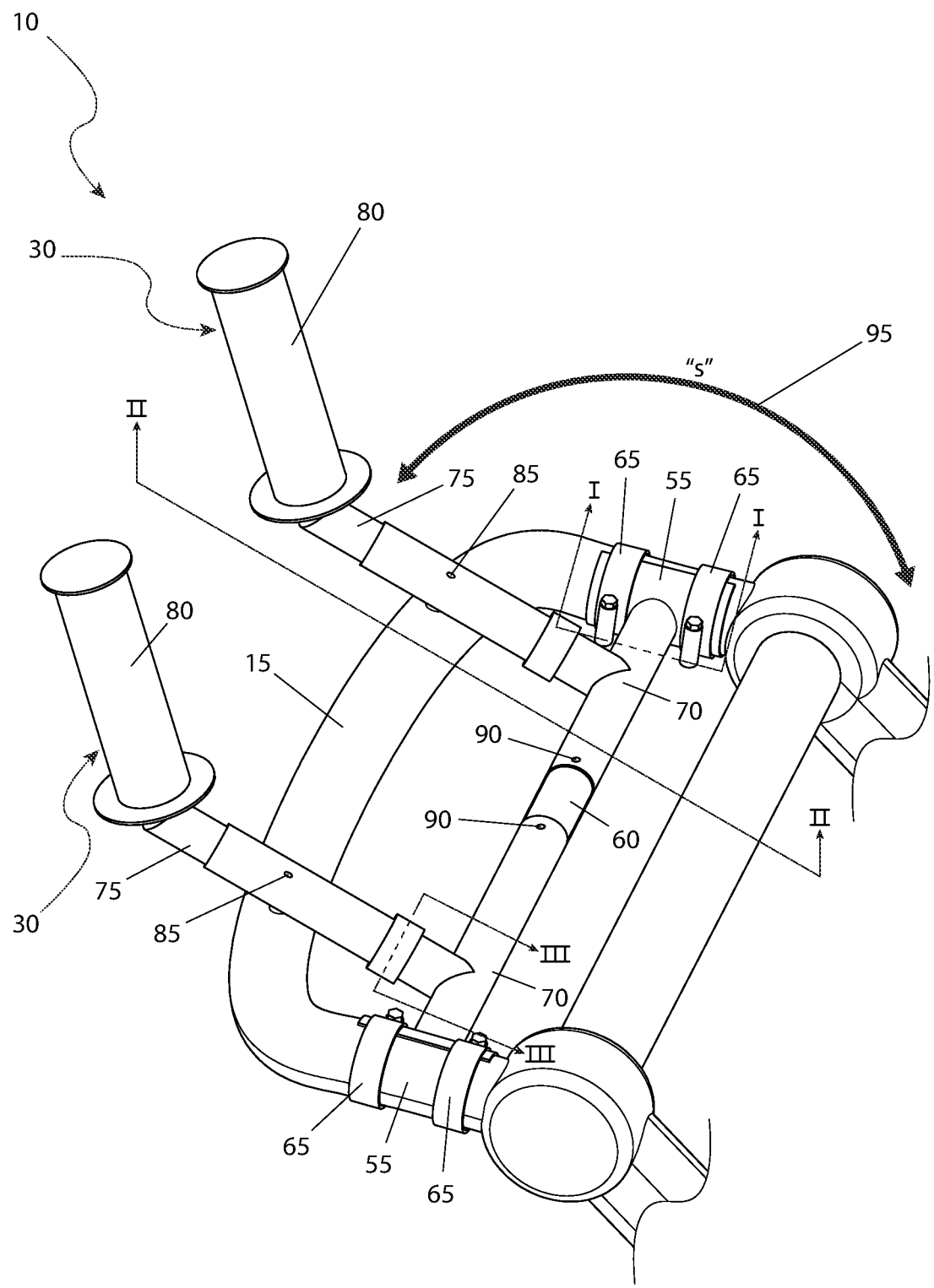
FIG. 2 is a perspective view of the stroller running handle device, according to the preferred embodiment of the present invention.

Referring next to FIG. 2, a perspective view of the device 10, according to the preferred embodiment of the present invention is depicted. This view provides detailed configuration information on the construction of the device 10 as well as attachment to the stroller handle 15. The device 10 uses two (2) bracket mounts 55 at the distal ends of a center mounting frame 60. The bracket mounts 55 connect to the stroller handle 15 and are mechanically fastened with two (2) attachment means 65, such as pipe clamps (as shown) for a total of four (4). The bracket mounts 55 are sized to span the size of the stroller handle 15. Two (2) spring housings 70 are located at the outer end of the center mounting frame 60 and each support two (2) extension arms 75. The uppermost end of the extension arms 75 are provided with ergonomic hand grips 80 for non-slip operation even with sweaty hands. The extension arms 75 are each provided with length adjustment pins 85 and the spring housings 70 are each provided with a spring locking pin 90. When the spring locking pins 90 are disengaged, the extension arms 75 can fold forward along a folding travel path "s" 95 to allow both extension arms 75 (included within running handles 30, as shown in FIG. 1) to within the confines of the stroller handle 15 to allow for storage and/or transport of the jogging stroller 20 (as shown in FIG. 1). Further details on the configuration of the length adjustment pins 85 and the spring locking pins 90 will be provided herein below.

Figure 3:
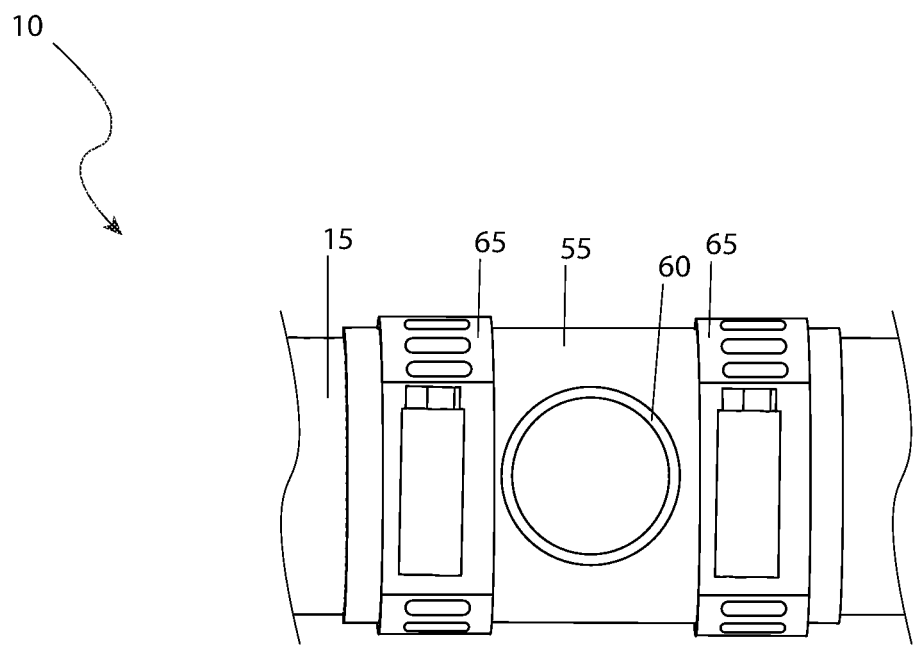
FIG. 3 is a sectional view of the stroller running handle device, as seen along a Line I-I, as shown in FIG. 2, according to the preferred embodiment of the present invention.

Referring now to FIG. 3, a sectional view of the device 10, as seen along a Line I-I, as shown in FIG. 2, according to the preferred embodiment of the present invention is shown. The center mounting frame 60 is centrally located in the bracket mounts 55 in a perpendicular manner. As aforementioned described, the attachment means 65 provided for the mechanical attachment of the bracket mounts 55 to the stroller handle 15. Additionally, the bracket mounts 55 allow the diameter of the stroller handle 15 to vary. It is envisioned that all diameters of all stroller handle 15 of nearly all makes and models of jogging stroller 20 (as shown in FIG. 1) will be accommodated by the universal design of the bracket mounts 55. The removable nature of the attachment means 65 allow for the device 10 to be removed should its functionality no longer be required. Also, the removal functionality allows the device 10 to be moved to another jogging stroller 20 should the original jogging stroller 20 be replaced, or a jogging stroller 20 be used in a rental situation. Upon removal of the bracket mounts 55 and the device 10, the stroller handle 15 is restored to its original condition with no tell-tale markings left behind.

Figure 4:
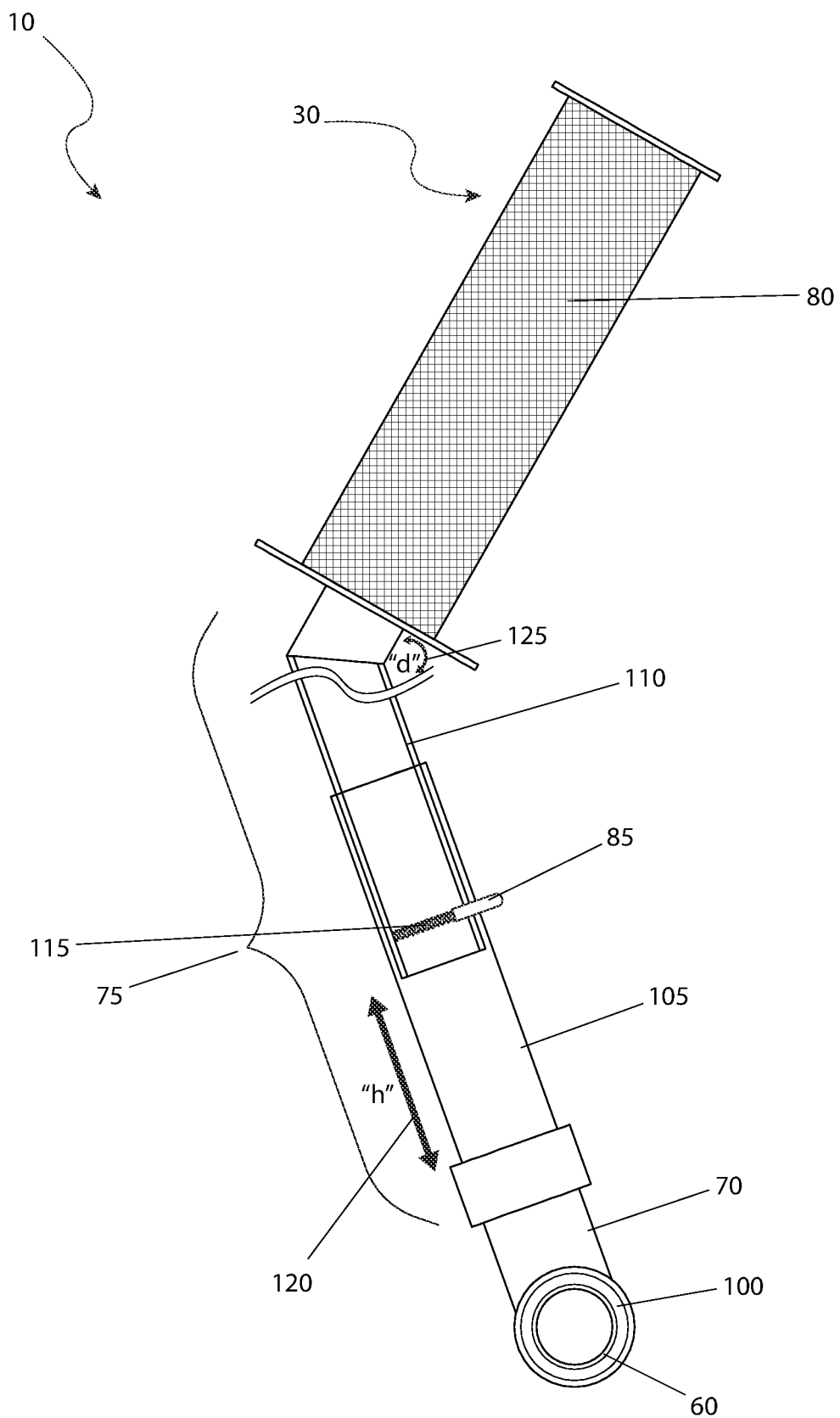
FIG. 4 is a sectional view of the stroller running handle device, as seen along a Line II-II, as shown in FIG. 2, according to the preferred embodiment of the present invention.

Referring next to FIG. 4, a sectional view of the device 10, as seen along a Line II-II, as shown in FIG. 2, according to the preferred embodiment of the present invention is disclosed. The center mounting frame 60 is encompassed by a reciprocating spring 100 which allows for the first semi-circular travel path "a" 40 (as shown in FIG. 1). One (1) end of the first semi-circular travel path "a" 40 is connected to the center mounting frame 60 while the opposite end is connected to the spring housings 70. As the user 25 (as shown in FIG. 1) pushes on one (1) of the running handles 30 (as shown in FIG. 1), the forward motion travel path "f" 50 (as shown in FIG. 1) is generated. During this time, the reciprocating spring 100 drives the other running handle 30 backwards. At the completion of the travel, the roles of the running handles 30 are reversed. Such action is repeated over and over to drive the jogging stroller 20 forward. The spring housings 70 is connected to a lower extension arm segment 105 of the extension arms 75 into which an upper extension arm segment 110 is inserted. The lower extension arm segment 105 is provided with multiple holes arranged in a linear format into which the length adjustment pin 85, with the aid of a pin spring 115 can engage. As such the overall length of the extension arms 75 can be adjusted along a handle length travel path "h" 120, by varying the amount of the engagement of the upper extension arm segment 110 within the lower extension arm segment 105. The upper end of the upper extension arm segment 110 is provided with an offset angle "d" 125 to allow for a more vertical position of the ergonomic hand grips 80. It is noted that the overall length of the extension arms 75 is determined by the user 25 to keep their arms in a proper position for running.

Figure 5:
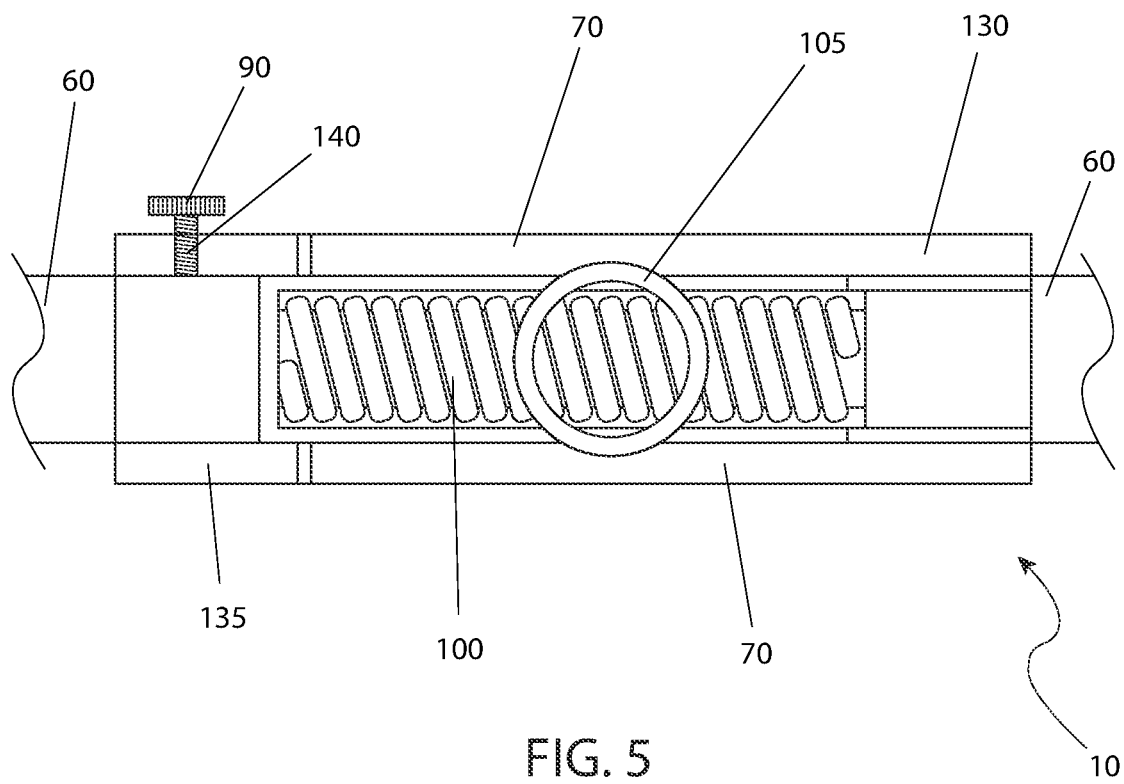
FIG. 5 is a sectional view of the stroller running handle device, as seen along a Line III-III, as shown in FIG. 2, according to the preferred embodiment of the present invention.

Referring to FIG. 5, a sectional view of the device 10, as seen along a Line III-III, as shown in FIG. 2, according to the preferred embodiment of the present invention is depicted. The reciprocating spring 100 is contained within the spring housings 70 as shown and is mechanically affixed to the first end housing 130 at one (1) end and subsequently affixed to the center mounting frame 60. The opposite end of the reciprocating spring 100 is affixed to a second end housing 135 and is affixed to the center mounting frame 60 by a spring locking pin 90. The spring locking pin 90 is shown secured by threads 140, however, other methods of securement may be used and as such, the specific use of any particular type of securement is not intended to be a limiting factor of the present invention. Finally, the lower extension arm segment 105 exits the spring housings 70 at a perpendicular angle.

2. OPERATION OF THE PREFERRED EMBODIMENT

The preferred embodiment of the present invention can be utilized by the common user in a simple and effortless manner with little or no training. It is envisioned that the device 10 would be constructed in general accordance with FIG. 1 through FIG. 5. The user 25 would procure the device 10 from conventional procurement channels such as department stores, discount stores, baby item stores, mail order and internet supply houses and the like.

After procurement and prior to utilization, the device 10 would be installed in the following manner: the bracket mounts 55 are positioned at the uppermost portion of the stroller handle 15 and secured in place with two (2) attachment means 65 at each bracket mounts 55; the length adjustment pins 85 are manipulated against the pin spring 115 while adjusting the extension arms 75 to the proper height of the runner/jogger 25; and the second end housing 135 is secured against the center mounting frame 60 using the spring locking pins 90.

During utilization of the device 10, the following procedure would be initiated: the user 25 will grab each of the running handles 30 in the respective hand and begin running; the natural movement of the arms 45 will drive one (1) extension arm 75 and thus the first semi-circular travel path "a" 40 forward on each forward motion of the arm of the user 25; forward motion is limited or restrained by the reciprocating spring 100 in each running handles 30 to prevent extension of the elbow past the hips of the user 25; and said motion repeats in a reciprocating manner to propel the jogging stroller 20 along the forward motion travel path "f" 50.

After use of the device 10, the running handles 30 may be folded forward along the folding travel path "s" 95 by manipulation of the spring locking pins 90 to release the pressure of the reciprocating spring 100; the running handles 30 are then folded forward to facilitate storage and transport of the jogging stroller 20.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A stroller running handle device, comprising:
   a pair of bracket mounts, each of the pair of bracket mounts are disposed on each of a first distal end and a second distal end of a center mounting frame, the bracket mounts are adapted to connect to a stroller handle of a jogging stroller with a means for attachment;
   a pair of spring housings disposed on an outer end of the center mounting frame, each of the spring housings are provided with a spring locking pin;
   a pair of extension arms each having an uppermost end, the overall length of each of the extension arms are adjusted along a handle length travel path, by varying an amount of engagement of an upper extension arm segment of the extension arms within a lower extension arm segment of the extension arms;
   a pair of running handles having a first handle and a second handle, the first handle is adapted to be pushed on to move the jogging stroller forward;
   a reciprocating spring adapted to drive the second running handle of the pair of running handles backwards and,
   wherein the reciprocating spring is encompassed by the center mounting frame which allows for a first semi-circular travel path;
   wherein the reciprocating spring is contained within the spring housings and is mechanically affixed to the first end housing at one end and subsequently affixed to the center mounting frame; and,
   wherein the opposite end of the reciprocating spring is affixed to a second end housing and is affixed to the center mounting frame by a spring locking pin.

2. The stroller running handle device, according to claim 1, wherein the means for attachment include two pairs of pipe clamps.

3. The stroller running handle device, according to claim 1, wherein the means for attachment are removable.

4. The stroller running handle device, according to claim 3, wherein the means for attachment are adapted to be moved and utilized on another jogging stroller.

5. The stroller running handle device, according to claim 1, wherein upon removal of the bracket mounts, the stroller handle includes no bracket mount markings marring the stroller handle.

6. The stroller running handle device, according to claim 1, wherein a first one of a two pairs of pipe clamps attach each of the pair of bracket mounts.

7. The stroller running handle device, according to claim 1, wherein each of the bracket mounts may be configured to span the stroller handle width.

8. The stroller running handle device, according to claim 1, wherein the center mounting frame is centrally disposed on each of the bracket mounts in a perpendicular manner.

9. The stroller running handle device, according to claim 1, wherein the bracket mounts are adjustable to allow for a different diameter of the stroller handle.

10. The stroller running handle device, according to claim 1, wherein the bracket mounts are designed to be universal.

11. The stroller running handle device, according to claim 1, wherein when the spring locking pins are disengaged, the extension arms fold forward along a folding travel path to allow both of the extension arms to move within the stroller handle to allow for storage and/or transport of the jogging stroller.

12. The stroller running handle device, according to claim 1, wherein the spring housings are connected to the lower extension arm segment of the extension arms into which the upper extension arm segment is inserted.

13. The stroller running handle device, according to claim 1, wherein the lower extension arm segment is provided with a plurality of holes arranged in a linear format.

14. The stroller running handle device, according to claim 13, wherein the extension arms each include a length adjustment pin, which is mechanically engaged with the spring locking pin.

15. The stroller running handle device, according to claim 1, wherein each of the uppermost ends of the extension arms are provided with an ergonomic hand grip for non-slip operation.

16. The stroller running handle device, according to claim 1, wherein the upper end of the upper extension arm segment is provided with an offset angle to allow for a more vertical position of the ergonomic hand grips.

\* \* \* \* \*